UNITED STATES PATENT OFFICE.

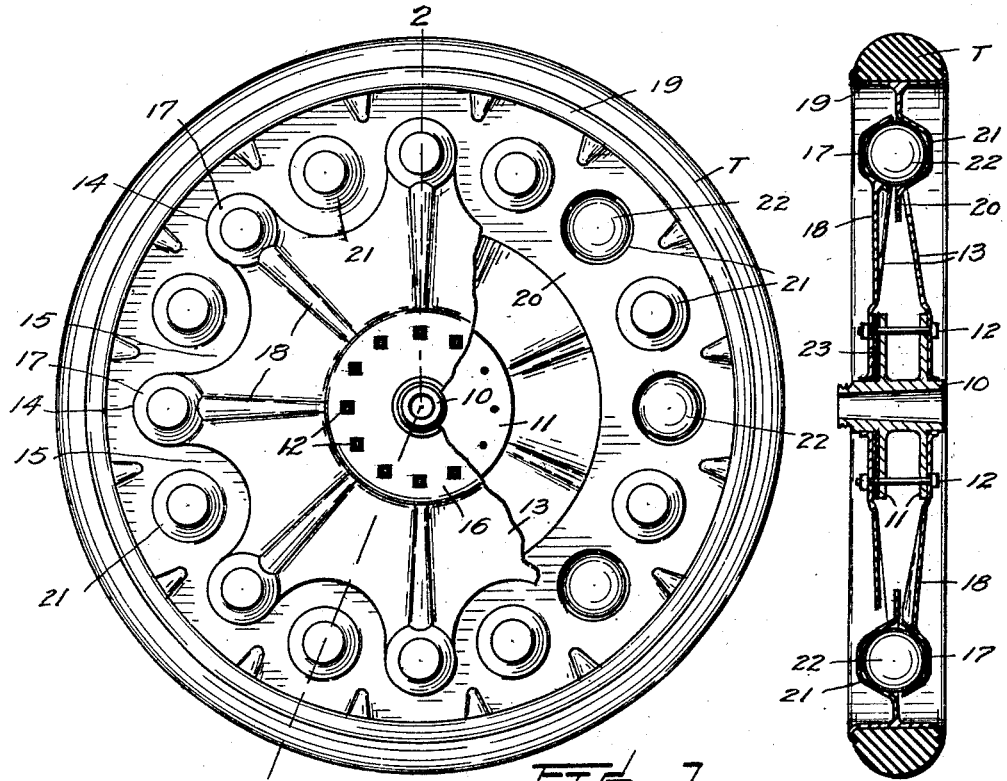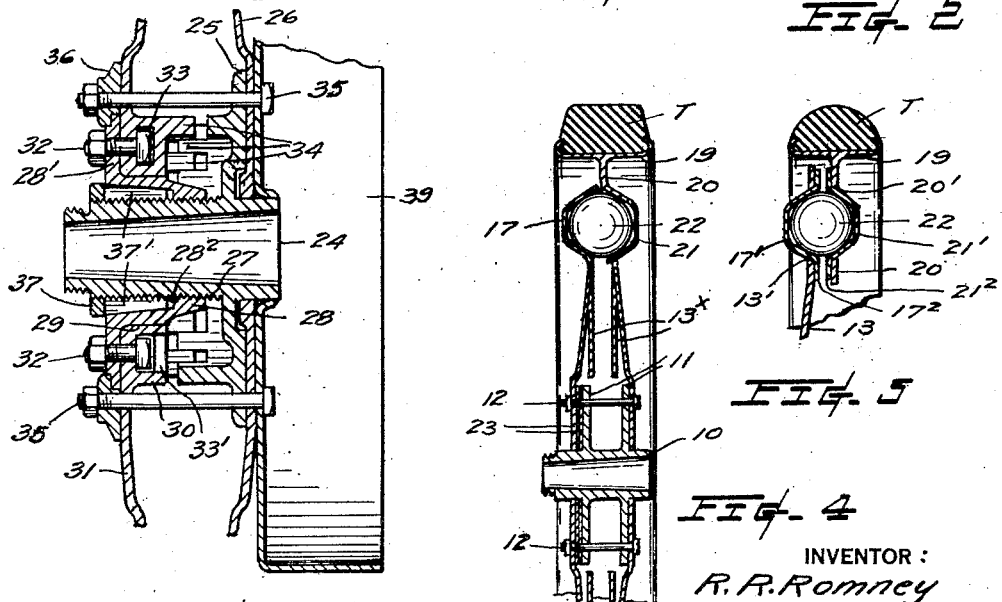

RICHARD R. ROMNEY, OF SEATTLE, WASHINGTON, ASSIGNOR TO ELLIS RESILIENT WHEEL CORPORATION, OF SEATTLE, WASHINGTON, A CORPORATION OF WASHINGTON.

VEHICLE-WHEEL.

1,383,240.      Specification of Letters Patent.      Patented June 28, 1921.

Application filed August 13, 1919. Serial No. 317,170.

*To all whom it may concern:*

Be it known that I, RICHARD R. ROMNEY, a citizen of the United States, residing at Seattle, in the county of King and State of Washington, have invented certain new and useful Improvements in Vehicle-Wheels, of which the following is a specification.

This invention relates to vehicle wheels, and specifically to improvements in the resilient wheel shown and described in U. S. Patent No. 980,226, issued January 3, 1911.

The object of the present invention is to provide a wheel of this character of very simple construction, composed of few parts which are readily accessible, and which cannot get out of order.

I attain these ends by the mechanism illustrated in the accompanying drawings, in which—

Figure 1 is a side elevation of a wheel embodying my improvements in its preferred form, part of one of the hub plates being broken away.

Fig. 2 is a sectional view through 2—2 of Fig. 1. Fig. 3 is a detail transverse sectional view showing a modified construction of the hub assembly. Figs. 4 and 5 are fragmentary sectional views of wheels showing other modifications.

In said drawings, and referring particularly to Figs. 1 and 2, the numeral 10 designates a hub having at short distances from its ends circumferential flanges 11.

Fitting upon the hub ends and secured by bolts 12 to said flanges are circular plates 13 having scalloped outer peripheries to afford alternate projections 14 and concavities 15.

The plates 13 are each formed with a central recessed boss 16 of slightly greater diameter than the hub flanges and hollow bosses or cups 17 in each projection 14. The plates 13 are furthermore provided with ribs 18 extending radially from the boss 16 to the respective cups 17.

19 represents the wheel rim which, as shown, is recessed to accommodate the tire T and extending inwardly from the rim and for a distance into the space between the two plates 13 is an annular web 20.

The web is pressed or otherwise formed to provide cup elements 21 arranged to have the cavities thereof alternately in opposite sides and opposed to the cup cavities of the plates 13 to afford receptacles for balls 22 of rubber or other suitable resilient material.

In practice, one or more washers 23 are interposed between a hub flange and the adjacent wheel plate 13 to regulate the pressure at which it is desired to subject the balls.

In Fig. 4 I show the wheel plates 13 provided with supplementary or reinforcing webs 13, secured at their outer peripheries as by welding to the respective plates $13^\times$ and thence extend inwardly of the wheel and within the space between the plates 13.

The construction illustrated in Fig. 5 is similar to that shown in Fig. 1 except that the ball receiving cups $17^1$ and $21^1$ are not integral with the plate and web elements 13 and 20 but are made separate and inserted in holes $13^1$ and $20^1$ provided in the respective parts.

These insertible cups are provided with flanges $17^2$ and $21^2$ which seat against the opposing faces of the plates and webs.

In Fig. 3 is shown a hub assembly which is designed, more particularly, for regulating the distance between the wheel plates 13. In this construction, the hub 24 is formed with a single flange element 25 integral therewith and adjacent to one end thereof to afford a bearing for a wheel plate 26.

The hub 24 is provided with external screw threads 27 from the referred to flange to within a short distance of the other end of the hub. 28 represents a nut engaging the hub thread and is provided with a cylindrical bearing surface 29 for a circular projection 30 provided at the inner side of a second wheel plate 31 and to which the nut is rigidly secured by bolts 32 passing through a flange $28^1$ of the latter. To accommodate the bolts the nut 28 is formed with an annular slot 33 of T-shape in transverse section and into which the bolts are successively introduced through a hole $33^1$.

The plate 31 is prevented from rotating relatively of the hub by the provision on the plate projection 30 and flange 25 of interengaging teeth 34. 35 represents bolts for coupling the plate 26 to the hub and also serves to supplement the above explained securing means for the plate 31 by passing through the latter and a reinforcing ring 36 located at the outerside of the plate. Associated with the nut 28 is a tapering lock nut 37 engaging the hub threads and is provided with longitudinal slots $37^1$ extending from its smaller end. The nut 28 is recessed by the provision of a conoidal counter bore $28^2$ into which the smaller end of the lock nut extends and is adapted to contract the slotted part of the lock nut to cause it to tightly embrace the hub and thereby eliminate any looseness in the nut 28.

Where a wheel is to be used for driving purposes in motor vehicles it is desirable to secure a brake-drum to the wheel which may be most conveniently attained by utilizing the bolts employed for securing the wheel plates in place as represented in Fig. 3 wherein 39 indicates the drum.

In assembling the parts of my improved wheel the balls 22 are placed in the cavities of the web cups 17 and the plates 13 mounted on the hub ends and regulated so that the cup cavities of the plates will receive the respective balls.

By thus regulating the plates the projections 14 of one plate will be located in radial planes medial of the concavities 15 of the companion plate thereby positioning the cups 21 of the rim web 20 to project into the plate concavities at opposite ends of the wheel alternately. By such devices the cup and the resilient balls or cushioning devices 22 may be located in proximity to the wheel rim and enable the plate and web members to overlap each other and afford strong and rigid frames in which the balls are carried.

In assembling the wheel parts when constructed as shown in Figs. 1, 2 and 4 the combined thicknesses of the washers 23 should be sufficient to enable the securing bolts 12 to connect the plate members 13 firmly to the hub flanges when a pressure is applied to the balls to insure a suitable bearing of the same in the respective cups.

With the construction shown in Fig. 3, however, but one hub flange, 25, is employed and the complementary flange 28¹ is movable relatively thereto, obviating the use of spacing washers and the plates are regulated with respect to each other by manipulating the nut 28. In the heavier type of vehicles, like motor trucks for example, the mounting of the wheel plates as illustrated in Fig. 3 is preferred as it renders the adjustments more readily effected than in the first explained organization.

What I claim, is—

1. In a wheel, the combination of a hub, two circular plates carried thereby in spaced relations and having scalloped peripheries, said plates being arranged to have the peripheral projections of one be in radial planes medial of the peripheral concavities of the other plate, cup elements provided in the projections of each of said plates, a rim having an internal web provided with cup elements with the cavities thereof opposing the cup elements of each plate and extending into the concavities between the projections of the other plate alternately, resilient balls in the opposing cup elements of said web and plates, and means for connecting said plates to the hub.

2. In a wheel, the combination of a hub, a pair of circular plates rigidly secured to said hub and provided with ball receiving cavities in their inner surfaces and in unopposed relations, an annular member extending between the aforesaid plates concentric to the wheel axis, said member being provided with a series of circumferentially arranged cavities alternating from opposite sides of the member and in opposed relations to the respective plate cavities, resilient balls provided in the associated plate and member cavities, and means for regulating the spacing of the plates with respect to said member.

Signed at Seattle, Washington, this 7" day of August, 1919.

RICHARD R. ROMNEY.

Witnesses:
PIERRE BARNES,
ELIZABETH JOHNSON.